United States Patent [19]

Jelinek

[11] 3,930,656
[45] Jan. 6, 1976

[54] SEALED JOINT AND GASKET THEREFOR
[75] Inventor: Jerry G. Jelinek, La Habra, Calif.
[73] Assignee: Parker-Hannifin Corporation, Cleveland, Ohio
[22] Filed: Feb. 22, 1974
[21] Appl. No.: 444,907

[52] U.S. Cl. ............ 277/180; 277/166; 277/207 A; 277/211; 277/235 B
[51] Int. Cl.² ................... B65D 53/00; F16L 19/02
[58] Field of Search ............ 277/207 R, 207 A, 180, 277/211, 235, 213, 168, 209, 166; 285/363; 418/149

[56] References Cited
UNITED STATES PATENTS

| 494,402 | 3/1893 | Walsh | 277/211 X |
|---|---|---|---|
| 3,033,582 | 5/1962 | Creavey | 277/207 |
| 3,448,986 | 6/1969 | Jelinek et al. | 277/180 |
| 3,655,210 | 4/1972 | Farnam et al. | 277/235 B |
| 3,721,452 | 3/1973 | Black | 277/211 |

Primary Examiner—Richard E. Aegerter
Assistant Examiner—L. Footland
Attorney, Agent, or Firm—John N. Wolfram

[57] ABSTRACT

A sealed joint between two members. The joint utilizes a gasket that includes a rigid plate having a generally U shaped corrugation therein that forms a recess in one face of the plate and a raised rib on the other face. The face having the raised rib has a layer of elastomeric material thereon on opposite sides of the rib for sealing engagement with one of the members. Elastomeric material is also contained within the recess for sealing engagement with the other member. One of the members may have a recess for receiving the gasket and the depth of the recess may be greater than the axial thickness of the rigid plate at the corrugation whereby the members do not impose axial compression on the corrugation when the joint is tight. In another form of the invention, the rigid plate may have another corrugation spaced from the first corrugation and of slightly greater axial length. This gasket may be used between two members, neither of which has a recess, and wherein the second corrugation is engaged by the members to limit the amount that the members may be brought toward each other and thus prevent the members from imposing axial compression on the first corrugation.

15 Claims, 10 Drawing Figures

U.S. Patent  Jan. 6, 1976  3,930,656
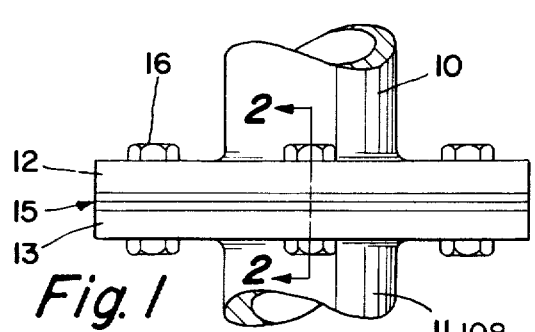
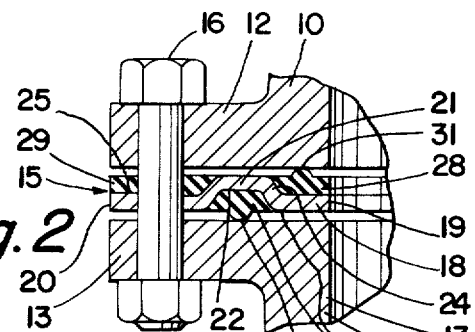
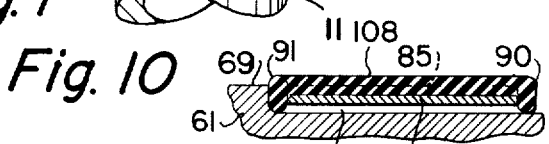
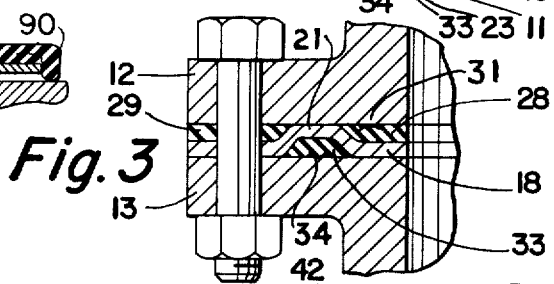
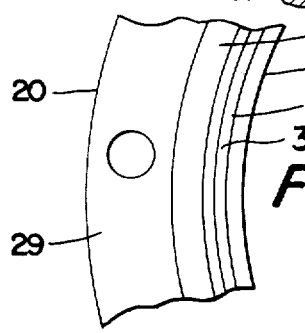
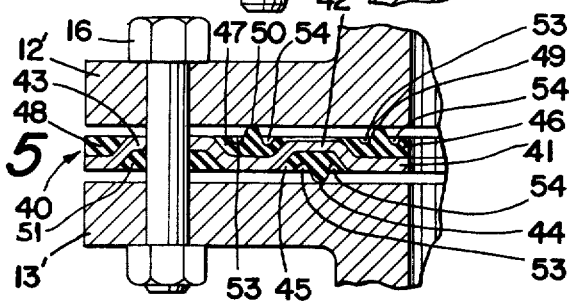
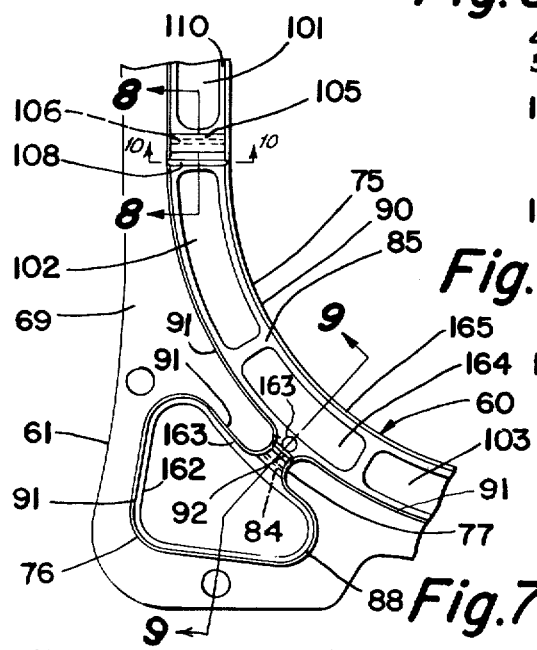
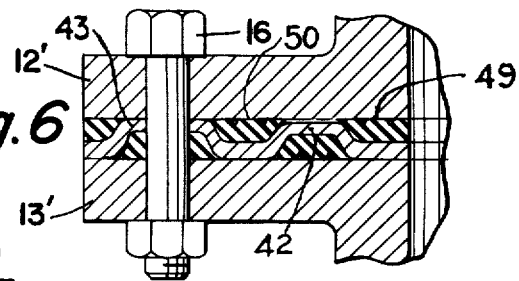
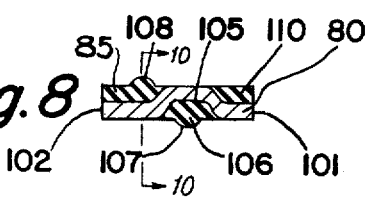
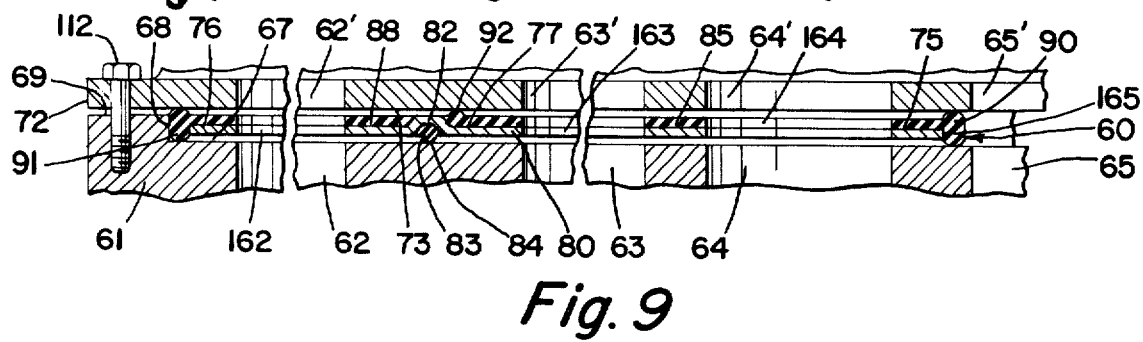

3,930,656

SEALED JOINT AND GASKET THEREFOR

BACKGROUND OF THE INVENTION

This invention relates to a joint between two members and to a gasket for sealing such joint in which the gasket includes a part of relatively rigid material and other parts of elastomeric or other relatively deformable material. Typical gaskets of this general type, and joints utilizing the same, are disclosed, for example, in U.S. Pat. No. 2,717,793 of Nenzell issued Sept. 13, 1955; U.S. Pat. No. 3,664,676 of Peterson issued May 23, 1972; and U.S. Pat. No. 3,721,452 of Black issued Mar. 20, 1973. Typically, the rigid material of the gasket is utilized for supporting the elastomeric material and for being engaged by the members being sealed so as to limit the compression that may be placed upon elastomeric portion of the seal by the members. It is also desirable that the elastomeric material be backed up by either the rigid portion of the gasket or by portions of the members so as to prevent extrusion of the elastomeric material from the joint when subjected to high fluid pressure. This frequently involves crushing of the rigid portion of the gasket so as to render reuse doubtful or impossible. In other instances, it requires special gasket configurations that are difficult and expensive to manufacture.

In many cases, it is desirable to have a gasket of special configuration for sealing more than one fluid passage in the members to be sealed, as for example in U.S. Pat. No. 3,664,676 wherein a single gasket assembly seals a number of fluid passages between the cylinder block and cylinder head of an internal combustion engine. In such cases it is desirable to use a single plate of rigid material for supporting a number of elastomeric sealing elements for sealing the various fluid passages. However, in this patent the rigid plate for supporting the elastomeric gaskets does not provide backup support for the elastomeric material and there are separate backup members provided to cooperate with separate elastomeric sealing members at each fluid passage.

SUMMARY OF THE INVENTION

The present invention is adaptable for joints between opposed flat unrecessed faces between two members, as in U.S. Pat. No. 2,717,793, as well as for sealing between members in which one has a recess for receiving the gasket, as disclosed for example in U.S. Pat. No. 3,664,676. In either case, the gasket comprises a part of relatively rigid material, such as metal or plastic, and a part of relatively readily deformable material such as rubber or other elastomeric material.

The rigid material is in the form of a thin plate having one or more openings therethrough corresponding to openings in the members. When only one opening, such as the passage between a pair of pipe flanges, is to be sealed from the exterior, the rigid gasket portion has a generally U shaped corrugation surrounding the opening. The corrugation forms a recess in one face of the rigid part and a raised rib on the other face. The corrugation is spaced from the inner and outer marginal edges of the rigid part. The recess contains elastomeric material that initially projects from the recess for making sealing contact with one of the flanges. The faces of the rigid portion adjacent the inner and outer sides of the rib are covered with a layer of elastomeric material. The layer on either one or both sides of the rib has a raised bead which may be deformed into sealing contact with the other flange. The rib provides a backup for the bead to prevent extrusion of the latter by fluid pressure from the joint and the layers on each side of the rib otherwise eliminate gaps in the joint and permit tightening of the latter with reduced or no crushing force on the rib.

In an alternate arrangement the rigid portion may have another corrugation that forms a rib higher than the rib on the first corrugation so as to contact the flanges and limit the amount that they may be brought together whereby to prevent contact of the first corrugation with both flanges and thus prevent crushing of the first corrugation by the flanges.

In joints where one of the members to be sealed has a recess for receiving the gasket, the corrugation can be slightly shallower than the depth of the recess so that when the parts to be sealed come together at faces surrounding the recess the members do not engage both ends of the corrugation in a manner to axially load and crush the corrugation.

For applications in which there are two or more openings in members to be sealed from each other, the corrugation may be formed between the two openings for backing up a portion of the elastomeric material against extrusion from the one opening to the other.

The invention also has particular usefulness in applications where a main gasket portion has one or more auxillary gasket portions attached thereto and the gasket serves to seal between such portions as well as within such portions. In such case, the rigid part of the gasket may have a bridging section for connecting the two portions and the bridging section has a corrugation for backin up elastomeric material that seals between the two portions.

The invention also contemplates forming elastomeric beads at the inner and outer margins of the rigid portion and along the corrugations for facilitating sealing at these locations.

DETAILED DESCRIPTION

FIG. 1 is a side view of a pipe flange joint in which the invention may be utilized.

FIG. 2 is a fragmentary cross section view along the lines 2—2 of FIG. 1 showing the parts in untightening condition.

FIG. 3 is a view like FIG. 2 showing the parts in tightened condition.

FIG. 4 is a fragmentary top view of the gasket of FIG. 1.

FIG. 5 is a view like FIG. 2 of a modified form of the invention.

FIG. 6 is a view like FIG. 5 but in the tightened condition.

FIG. 7 is a fragmentary top view of a special purpose gasket and one of the members to be sealed.

FIG. 8 is a section view along the lines 8—8 of FIG. 7.

FIG. 9 is a cross section view along the lines 9—9 of FIG. 7 but including both members to be sealed.

FIG. 10 is a cross section view on lines 10—10 of FIGS. 7 and 8.

The flanged pipe joint of FIG. 1 includes pipes 10 and 11 with flanges 12 and 13 welded thereon respectively and with a gasket 15 in accordance with the present invention therebetween. Bolts 16 connect the flanges in the customary manner.

As shown in FIG. 2, gasket 15 comprises a thin metal plate 18 of annular form with an inside diameter at 19 and an outside diameter at 20 and it has a circular corrugation 21 of generally U cross section configuration with a recess 22 in lower face 23 and a raised rib 24 on upper face 25.

Bonded to the upper face 25 of the metal plate 18 is a thin sheet or layer 28 of elastomeric material inwardly of rib 24 and another sheet or layer of elastomeric material 29 radially outwardly of rib 21.

Layer 28 has a circular bead 31 projecting therefrom closely adjacent rib 24. The top faces of layers 28, 29 are substantially flush with the top surface of rib 24, or they may project a few thousandths of an inch thereabove.

Recess 22 is substantially filled by elastomeric material forming a packing ring 33 that is substantially flush with lower surface 23 of the metal plate except for a circular bead 34 that initially projects outwardly beyond face 23. The metal plate 18 and the outer sheet 29 have a series of aligned openings therethrough for receiving bolts 16.

When bolts 16 are tightened, the flanges 12, 13 are brought together and deform ribs 31 and 34 so that flange 12 is in contact with the upper faces of sheets 28, 29 and of corrugation 21 and flange 13 will be in contact with the lower face of metal plate 18 and gasket 33, as shown in FIG. 3. Because of the forced deformation of bead 31, the deformed bead will be in much tighter contact with flange 12 than will be the remaining portion of the upper faces of elastomeric sheets 28, 29. Under high fluid pressure within the pipes, fluid may force its way between the upper face of sheet 28 and flange 12 but will not force its way past the deformed bead portion 31. However, it will exert a radially outward force on this deformed bead portion but the latter is supported by the adjacent metal rib 24 against radially outward deflection or extrusion that might otherwise result in leakage.

Likewise, bead 34 as deformed in FIG. 3 has high pressure contact with flange 13 and is supported against outward deflection or extrusion by the radially outward wall of recess 22. Further tightening of bolts 16 tends to crush the gasket but a substantial portion of the force from the bolts is transmitted to elastomeric sheets 28, 29 and packing 33 as well as the axially opposite portions of metal plate 18. Because elastomeric materials, such as synthetic rubber, are relatively incompressible, and because of the relatively large area presented by elastomeric sheets 28, 29 and packing 33 to the flanges, there is substantial resistance to thinning out of the elastomeric portions and thus there is little or no force from the bolts that is exerted upon corrugation 21 in a manner tending to crush or reduce the height of the corrugation. Thus, the gasket is not damaged by assembly force in normal use and the joint may be opened and closed many times without replacing the gasket.

In the modification shown in FIG. 5, gasket 40 comprises a metal plate 41 having a first radially inward circular corrugation 42 therein and a second circular radially outward corrugation 43 that is slightly greater in axial direction, as for example 0.005 inch, and which has an opening therethrough for receiving a bolt 16.

Gasket 40 has a packing ring 45 within the recessed portion of corrugation 42 and there are inner and outer elastomeric sheets 46, 47 of elastomeric material on radially opposite sides of corrugation 42 and another elastomeric sheet 48 outwardly of corrugation 43. There is also an elastomeric sheet 51 within corrugation 43.

The thickness of sheets 46, 47 and 48 are such that their upper surfaces are slightly above the upper surface of corrugation 42 but substantially flush with the upper surface of corrugation 43. Packing 45 and sheet 51 have their lower faces substantially flush with the lower face of plate 41.

Packing 45 has a bead 44 initially projecting therefrom and may have small recesses 53, 54 on each side of bead 44 that are inwardly of the lower face of plate 41. Likewise, there may be similar recesses 53, 54 on opposite sides of beads 49, 50.

When the joint of FIG. 5 is tightened, as shown in FIG. 6, beads 44, 49 and 50 are deformed to substantially fill the respective adjacent grooves 53, 54 and make tight sealing contact with the respective flange 12' or 13'. The flanges will also directly engage the lower face of metal plate 41 and the upper face of corrugation 43 for strongly resisting further tightening movement of the flanges. At this time the upper surface of corrugation 42 is slightly spaced from flange 12' so that it is free of axial compression tending to crush the same. This axial spacing may be on the order of 0.005 inch and is not sufficient for permitting extrusion of bead 49, or other portions of sheet 46, therethrough when the joint is subjected to high internal fluid pressure.

Bead 50 is provided in the event the installation is such that high external fluid pressure may be applied to the joint so that no fluid will leak from the outside to the inside. Alternatively, the installation may be such that the inside of the flanged pipes may be alternatively subjected to pressure and vacuum, in which case bead 49 seals against the pressure condition and bead 50 seals against the vacuum condition. Obviously, bead 49 may be omitted, if the joint is subjected only to vacuum and bead 50 may be omitted if the joint is subjected only to pressure.

The invention has further advantages in connection with special purpose gaskets, such as a gasket to be utilized between cylinder blocks and cylinder heads of internal combustion engines of either reciprocating or rotating piston types. A portion of a gasket 60 for use in a rotary engine is illustrated in FIGS. 7, 8 and 9. In this case, the rotary engine may have a block 61 having a plurality of fluid passages 62, 63, 64 and 65 therein and which intersect the bottom wall 67 of a counterbore or recess in the block that has a side wall 68 which in turn is surrounded by a flat clamping face 69. Overlying the recess is a head 72 having a flat face 73 that is intersected by openings 62', 63', 64' and 65' that are aligned with respective openings of the block 61.

Gasket 60 has a main portion 75 that encircles openings 65, 65' and it has an appendage 76 that encircles openings 62, 62' and which is connected to main portion 75 by a bridging or connecting portion 77.

In this instance, gasket 60 comprises a metal plate 80 having openings 162, 163, 164 and 165 therethrough corresponding to and aligned with block opening 62, 63, 64 and 65. Bridging portion 77 has a corrugation 82 therein that extends thereupon across between main gasket portion 75 and appendage 76. Bonded within recessed portion of corrugation 82 is a packing 83 of elastomeric material which has a bead 84 projecting from such recess.

Bonded to the upper surface of metal plate 80 on the main portion 75 of the seal on one side of corrugation 82 is a thin sheet 85 of elastomeric material and there is another sheet of elastomeric material 88 bonded to the upper face of appendage portion 76. These sheets have openings corresponding to and aligned with openings 162, 163, 164 and 165 of metal plate 80.

Elastomeric sheet 85 at its inner margin has a bead 90 that projects upwardly from the upper face of sheet 85 and also downwardly beyond the lower face of metal plate 80. There is a similar bead 91 along the outside edge of sheet 88 at the appendage portion 76 and which continues across bridging portion 77 and the outer margin of main gasket portion 75. Sheet 85 also has a raised bead 92 extending across bridging portion 77 closely adjacent and parallel to corrugation 82. As shown in FIG. 7, bead 92 is the same axial height as the upwardly projecting portions of beads 91 and 90 and merges with bead 91. Likewise, bead 84 projects downwardly from plate 80 the same distance as beads 90 and 91 and likewise merges with bead 91.

Main portion 75 of gasket 60 may have one or more additional openings 102 and 103 that are in register with similar openings in block 61 and cover 72 that need not necessarily be sealed from openings 62, 62' and 162 but which should be sealed from another opening 101 in the gasket which is aligned with and corresponds to similar openings, not shown, in block 61 and head 72. In such case, there are no sealing beads or corrugations formed in the gasket between gasket openings 102, 164 and 103 but there is a corrugation 105 extending across the metal plate between the openings 101 and 102. The recess in the corrugation is filled by a packing 106 having a bead 107 extending therefrom and whose ends merge with beads 91 and 90. Likewise, sheet 85 has a raised bead 108 closely adjacent corrugation 105 which extends between and merges with beads 90 and 91. Sheet 85 is thus interrupted at corrugation 105 but is joined to a similar sheet 110 on the other side of corrugation 105 and to which it is joined by beads 91 and 90 which are continuous. Thus, corrugation 105 acccommodates packing 106 for sealing between openings 102 and 101 on the lower side of metal plate 80 and also serves as a backup for bead 108 on sheet 85 that seals these two openings at the upper side of plate 80. In this case, pressure in opening 102 would be higher than in opening 101. If the reverse were true, bead 108 would be placed on the other side of corrugation 105. Likewise, if the pressure in opening 102 could alternately be higher and lower than that in opening 101, there could be another bead corresponding to 108 on the other side of corrugation 105.

When bolts 112 are tightened to bring head 72 into tight contact with block 61, beads 90, 91, 84, 92, 89, 106 and 108 are deformed to establish a seal with the respective portions of the head and block. Corrugations 82 and 105 initially may either have a height such that their top surfaces will be flush with surface 69 and in light contact with head 72 when the joint is fully tightened and the bottom face of metal face 80 engages the bottom wall 67 of the block recess, or the corrugations can be slightly shorter than the depth of the block recess so that the upper portion of these corrugations will be spaced a few thousandths of an inch from head 72 when the joint is tight.

Plates 18, 41 and 80 may be of any suitable metal but they may also be of rigid plastic, such as phenolic, melamine, nylon, teflon, glass filled materials, or the like.

I claim:

1. A gasket comprising a thin plate of rigid material having an opening therethrough and having radially spaced first and second edges and upper and lower faces, a generally U shaped corrugation in said plate between said edges and forming a recess in one face and a raised rib on the other face, said corrugation extending continuously about said opening, a sheet of elastomeric material on said other face on each side of said rib and having exposed flat faces, said sheet on one side of said raised rib having a bead projecting above said flat face thereon to a height above said other face greater than the height of said raised rib from said other face and an elastomeric sealing element in said recess and projecting therefrom.

2. The gasket of claim 1 in which the thickness of said sheets other than at said bead is substantially the same as the height of said rib.

3. The gasket of claim 1 in which each of said sheets extends from a respective side of said rib to a respective one of said edges.

4. The gasket of claim 1 in which said sheet on the other side of said rib also has a raised bead projecting above said rib.

5. The gasket of claim 1 in which said elastomeric material at one of said edges has a raised bead extending therealong.

6. The gasket of claim 1 in which said plate has another generally U shaped corrugation therein radially spaced from and of greater height than said first mentioned corrugation but of less height than said bead.

7. A gasket comprising a thin plate of rigid material having a central opening that forms an inner margin on said plate, said plate having an outer margin spaced radially outwardly of said inner margin, said plate having a series of other openings between said margins and spaced from each other circumferentially about said central opening, said plate having a generally U shaped corrugation between two of said other openings and extending in a transverse direction relative to said inner and outer margins, said corrugation forming a recess in one face of the plate and a first raised rib on the other face, a deformable packing in said recess, elastomeric material on said other face on each side of said rib, said material having projecting therefrom inner and outer beads that respectively extend along radially inner and outer sides of said two other openings, a first raised cross bead on said material on one side of said rib and located between said two other openings and connected to said inner and outer beads.

8. The gasket of claim 7 in which said plate has another opening radially outwardly of one of said other openings, said outer bead extends about said another opening, another generally U shaped corrugation in said plate between said another opening and said one of said other openings and forming a second raised rib on said other face, and there is a second raised cross bead on said material between said another opening and said one of said other openings and connected at its ends to said outer bead.

9. The gasket of claim 8 in which said first and second cross beads are closely adjacent and generally parallel to the respective one of said first and second raised ribs.

10. A sealed assembly comprising a first member having a opening therein, said opening being surrounded by a recess in said first member, said recess having a bottom wall surface and a side wall, said member having a first face radially outwardly of said side wall, a second member having a second surface overlying said first face and said bottom wall surface, a gasket within said recess, said gasket comprising a plate of rigid material that has a generally U shaped corrugation therein that surrounds said opening and is axially between said surfaces, said corrugation forming a recess in one face of the plate and a raised rib on the other face, a deformable packing in said recess and in sealing engagement with one of said surfaces, a first sheet of elastomeric material on said other face on one side of said rib, a second sheet of elastomeric material on said other face on the the other side of said rib, said sheets being of a thickness substantially the same as the height of said raised rib above said other face, one of said sheets having a first bead projecting axially therefrom, and said second surfaces having sealed engagement with said bead.

11. The joint of claim 10 in which said first bead is radially inward of said rib and the other of said sheets initially includes a second raised bead surrounding said rib and which also has sealed engagement with said second surface.

12. The joint of claim 10 in which said second surface is engageable with said first face and when said second surface and said first face are so engaged, the axial distance from said one face of the plate to the top of said rib is slightly less than the axial distance between said surfaces whereby said plate will remain out of contact with one or the other of said surfaces when said second surface engages said first face.

13. A sealed joint comprising a first member having a central opening therein and other openings spaced radially outward of the central opening, a second member overlying the first member, one of the members having a recess therein surrounding all of said openings, said recess having a bottom wall and a side wall, said members having opposed engageable faces surrounding said recess, said second member having a transverse face overlying said recess bottom wall, a gasket within said recess, said gasket including a plate of rigid material that has therein a central opening and other openings that are respectively aligned with said central and other openings of said first member, a generally U shaped corrugation in said plate between two of said other openings in said plate, said corrugation forming a recess in one face of the plate and a raised rib on the other face of the plate, a layer of readily deformable material on said other face of the plate, said layer including a raised inner bead extending along the inner margin of said plate at said central opening of said plate and a raised outer bead along the radially outward margin of said plate, said deformable material also including a raised bead connecting said inner and outer bead adjacent said corrugation, a deformable packing in said recess in sealing engagement with one of said members and said inner and outer beads being in sealed engagement with said members and said connecting bead being in sealed engagement with the other said members.

14. The joint of claim 13 in which the greatest axial dimension of said plate is less than the axial distance between said bottom wall and an opposed face of the other of said members when said engageable faces of said member are in contact with each other.

15. The joint of claim 14 in which said connecting bead is on one side of said rib and said layer includes another raised bead on the other side of said rib and in sealing engagement with said other member.

* * * * *